Dec. 13, 1949 — V. MILICH — 2,490,879
CASTER
Filed Dec. 30, 1947
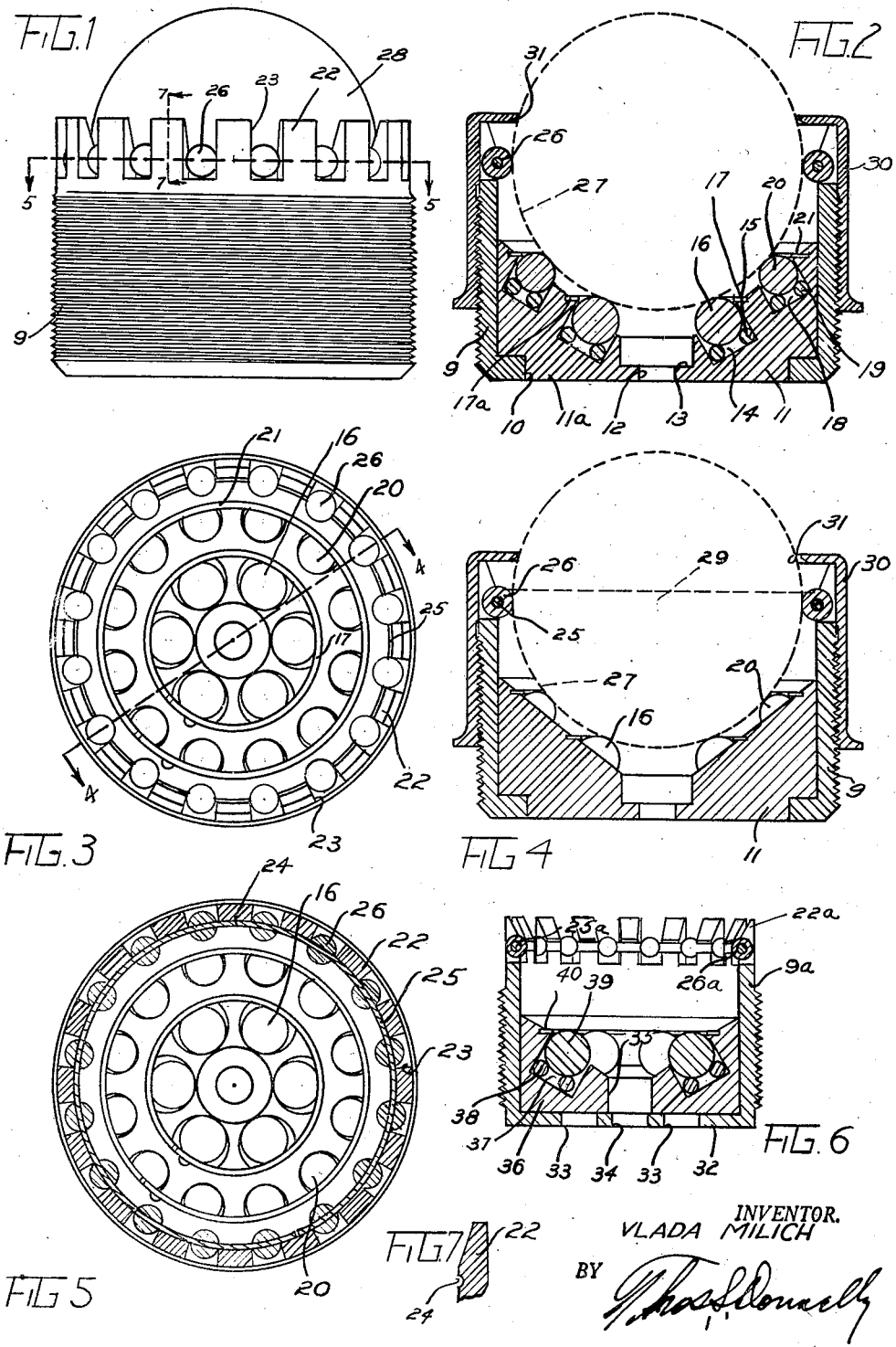
INVENTOR.
VLADA MILICH
BY
Thos L Donnelly
ATTORNEY.

Patented Dec. 13, 1949

2,490,879

UNITED STATES PATENT OFFICE 2,490,879

CASTER

Vlada Milich, Detroit, Mich.

Application December 30, 1947, Serial No. 794,476

2 Claims. (Cl. 16—26)

My invention relates to a new and useful improvement in a caster adapted for mounting on articles of furniture, hand trucks and the like.

It is an object of the present invention to provide a caster which will be simple in structure, economical of manufacture, durable, and highly efficient in use.

Another object of the invention is the provision of a caster having a rotating traction member so mounted that a minimum resistance to the rotation of the traction member when under load which is being moved will be encountered.

Another object of the invention is the provision of a caster having a spherical contact member for engaging the surface over which the article on which the caster is mounted is to be moved, with the caster so arranged and constructed that this spherical contact member will engage a plurality of rotatable balls so arranged that these balls define a substantially semispherical surface in which the spherical contact member seats.

Another object of the invention is the provision in a caster of a ring of rotatable balls so arranged and constructed that they will engage the spherical contact member which is also rotatable at a position so that the major portion of the contact member will be positioned between the ring of balls and the surface engaged.

Other objects will appear hereinafter.

It is recognized that various modifications and changes may be made in the detail of structure illustrated without departing from the invention and it is intended that such shall be embraced within the scope of the claims which form a part hereof.

Forming a part of this specification are drawings in which,

Fig. 1 is a side elevational view of the invention in inverted relation and with the cover removed, Fig. 2 is a central, vertical, sectional view of the invention in inverted relation, Fig. 3 is a plan view of the ball bearing part of the caster, Fig. 4 is a view similar to Fig. 2 and taken on line 4—4 of Fig. 3, with the cover positioned in place, Fig. 5 is a sectional view taken on line 5—5 of Fig. 1, with the contact member removed, Fig. 6 is a central, vertical, sectional view of a slight modification with the cover removed, Fig. 7 is a fragmentary, sectional view taken on line 7—7 of Fig. 1.

As shown in the drawings, I provide a cup-shaped member 9 threaded on its periphery and provided with an opening 10 formed in its base. A block 11 is positioned in the member 9 and provided with a portion reduced in diameter, as 11a, which extends into the opening 10. This block 11 is a snug fit in the member 9. It is preferred that the caster be formed from, preferably, metal and the parts 9 and 11 are formed from metal. A central opening 12 extends through the reduced portion 11a and communicates with the recess 13 formed in the block 11.

Formed in the block 11 is a circumferential row of spaced apart recesses 14 in each of which is positioned a plurality of rollers or balls 15 upon which a ball-bearing 16 is adapted to engage. A split resilient ring 17 is inserted in a groove 17a formed in the block 11 and adapted to overlie the balls 16 and prevent their dislodgement from the recesses 14. Another circumferential row of balls is mounted in the block 11 and this row is concentric with the row which is mounted in the recesses 14. This other circumferential row is mounted in the circumferentially arranged spaced apart recesses 18 in each of which is positioned a plurality of small ball-bearings 19 against which engages the larger ball-bearing 20 held in position by the split resilient ring 21.

The edge of the cup-shaped member is provided with a plurality of spaced apart teeth 22, these teeth being separated by the spaces 23. On the inner face of each of the teeth 22 is formed a groove 24 in which engages a resilient annular wire or band 25, and rotatably mounted on this wire or band 25 and positioned in each of the spaces 23 is a ball 26. It will be noted that the ball 26 projects inwardly beyond the inner face of the member 9 and terminates inwardly of the outer surface of the member 9 or the teeth 22. In the invention, I provide a traction or contact member 28 which is a sphere and which may be formed from glass, plastic material, or metal, or other suitable material. However, I prefer to use a sphere formed from slightly yieldable material and for this purpose, I employ a sphere formed from rubber so that the member 28 constitutes a rubber ball. Threaded on the member 9 is a cup-shaped cap 30 having the opening 31 formed in its base and through which the contact member 28 is adapted to project, this opening 31 being of smaller diameter than the diameter of the member 28. In Fig. 2 and in Fig. 4, I have shown the contact member 28 in dotted line. The outline 27 indicated at the balls 20, 16 and 26 determine a substantially semi-spherical surface. The dotted line 29 indicates a diameter of the contact member, and it will be noted that this diameter is slightly outward from the plane of the centers of the balls 26 so that when inward pressure is exerted on the contact member 28, it will move inwardly slightly into close contact with the balls 26. Consequently, the periphery of substantially half of the contact member 28 is contacted by the balls 16, 20 and 26 at spaced apart points. Experience has shown that with this construction, the contact member 28 will offer practically no resistance to its rotation when the article of furniture or other article on which the caster is mounted is attempted to be moved over a surface with the contact member 28 in contact therewith. Experience has also shown that it is necessary that the balls define a substantially semi-spherical surface and that the diameter of the contact member be positioned outwardly as referred to. When constructed in this manner, there is thus provided a very efficient caster and one which is durable and easily and quickly assembled.

In Fig. 6, I have shown a slight modification in which the cup-shaped member 9a is externally threaded to receive a cap, not shown. Formed in the bottom 32 of this cup-shaped member 9a are the openings 33 and 34, the opening 34 being formed centrally of the bottom 32 and in alignment with the opening 35 formed centrally in the block 36 which is positioned within the member 9a in stud relation. The openings 34 and 35, as well as the recesses 13 and the opening 12, afford a means for projecting of a screw therethrough to secure the device in fixed relation to the leg of furniture or the bottom of a truck or the like. In Fig. 6, the block 36 is provided with the recesses 37 which are in a circumferential row and spaced apart and in the bottom of each of these recesses is a plurality of balls 38 against which engages the balls 39 held in position by the split resilient ring 40. The teeth 22a are formed on the upper edge of the cup-shaped member 9a and balls 26a are similarly positioned in the spaces between the teeth 22a and rotatably mounted on a wire 25a. In the form shown in Fig. 6, the balls 39 and 25a also define a substantially semi-spherical surface. An easy rotation is also effected with the form shown in Fig. 6.

What I claim as new is:

1. In a caster of the class described: a cup-shaped member circular in cross section; axially directed teeth on one end of said member and circumferentially spaced apart; a resilient annular band, a plurality of balls mounted on said band in spaced relation, the space between said balls corresponding to the space between said teeth and said balls engaging in the space between said teeth and projecting inwardly from the inner space of said cup-shaped member, each of said teeth being provided on its inner face with a groove for reception of said band.

2. A caster of the class described, comprising: a cup-shaped member circular in cross section; axially directed teeth on one end of said member and circumferentially spaced apart; a resilient annular band, a plurality of balls mounted on said band in spaced relation, the space between said balls corresponding to the space between said teeth and said balls engaging in the space between said teeth and projecting inwardly from the inner space of said cup-shaped member, each of said teeth being provided on its inner face with a groove for reception of said band; a circumferential row of spaced apart anti-friction members projecting outwardly from the bottom of said member, said anti-friction members and said balls determining, by their inner faces, a substantially semi-spherical geometrical figure; and a spherical contact member engaging with said balls and projecting beyond the end of said cup-shaped member having the major portion thereof projected outwardly beyond the plane of said balls carried by said band.

VLADA MILICH.

REFERENCES CITED

The following references are of record in the file of this patent:

UNITED STATES PATENTS

| Number | Name | Date |
| --- | --- | --- |
| 647,675 | Koch | Apr. 17, 1900 |
| 1,222,045 | Sobilo | Apr. 10, 1917 |
| 2,182,445 | Milich | Dec. 5, 1939 |